Patented Feb. 5, 1935

1,989,784

UNITED STATES PATENT OFFICE 1,989,784

VAT AND SULPHUR DYESTUFF PREPARATIONS FOR TEXTILE PRINTING

Hermann Berthold, Leverkusen-I. G. Werk, and Eduard Albrecht, Frankfort - on - the - Main-Fechenheim, Germany, assignors to General Aniline Works, Inc., New York, N. Y., a corporation of Delaware No Drawing. Application May 22, 1933, Serial No. 672,348. In Germany May 26, 1932

7 Claims. (Cl. 8—6)

The present invention relates to new vat and sulphur dyestuff preparations for textile printing.

In accordance with the invention vat and sulphur dyestuff preparations are produced comprising pyridine betaine or its salts, such as pyridine betaine chlorohydrates or bromohydrates (see, for example, Mayer Jacobsen, Lehrbuch der org. Chemie, vol. 2, part 3, page 800 (1920) and Annalen der Chemie 326 (1903), pages 305 ff., and Journal für praktische Chemie, vol. 43 (1891) page 289).

The new preparations are employed for the printing of textiles, such as cotton, viscose, wool, cellulose acetate silk and the like. They are distinguished by considerable advantages over the preparations hitherto known for said purpose. Thus according to the invention pastes can be produced, which, especially when containing in addition glycerine or another similar polyvalent alcohol miscible with water, such as, for example, ethylene glycol, diethylene glycol, thiodiglycol, thiodiglycerol and the like, are of particular stability, do not form deposits or crusts and do not freeze or only freeze at very low temperature. Furthermore, the preparations containing the compounds specified ensure, when used for printing purposes, an improved fixing and stronger printings than the corresponding preparations not containing the additions in question. In the present process only such sulphur dyestuffs will yield good results, which already possess an affinity for textile fibers when applied for printing purposes without the addition of pyridine betaine or a salt thereof.

The extent of the effect attainable does not only depend on the nature of the dyestuff employed and on the compounds used as additions, but also on the method, by which the printing colors are produced from the dyestuff preparations and on the special method of printing. However, it must be pointed out that any of the known methods of printing with vat or sulphur dyestuffs is operable also in the present case.

Furthermore, printing colors containing pyridine betaine or a salt thereof yield substantially stronger printings and fix better than without these additions.

Finally, it is a remarkable effect of the presence of pyridine betaine or its salts in the printing colors that the printings can be stored for a prolonged time before the steaming process with any danger of decomposition.

The addition of pyridine betaine or its salts can be carried out at any desired stage of the manufacture of the printing color, for example:—

(a) The dyestuff, in form of a pressed cake containing water (12–40% dyestuff content), is stirred with glycerine or another similar polyvalent water soluble alcohol, and the desired assistant compound is added. The most favorable proportion of the addition depends largely on the degree of dispersion of the dyestuff. When the dyestuff pastes contain more water than is desired, they can be concentrated, for example, by evaporation.

Thus are obtained uniform, smooth pastes, which do not dry up, do not form encrustations, do not deposit, do not freeze and, even after prolonged standing, can still be worked up to valuable printing colors, especially, when a preserving agent is also added to the pastes.

(b) The dyestuff is finely ground and intimately mixed with the likewise finely ground addition in question.

(c) The dyestuff in form of a pressed cake containing water or in form of an aqueous paste is evaporated to dryness in the presence of the assistant compound to be added and, if desired, in the presence of dextrine or an emulsifying agent.

(d) The dyestuff is reduced in the presence of glycerine or of another similar polyvalent alcohol miscible with water, for example, thiodiglycol, thiodiglycerol or the like with previous, simultaneous or subsequent addition of the new assistants.

(e) The direct addition to the printing color of the pyridine betaine or its salts is also capable of considerably improving the printing qualities of the printing color, for example:—

72 grams of a thickening containing in 1000 parts by weight:
60 parts by weight of wheat starch,
150 parts by weight of water,
60 parts by weight of British gum,
260 parts by weight of industrial gum (1:1),
170 parts by weight of tragacanth (65:1000),
150 parts by weight of potassium carbonate and
150 parts by weight of sodium formaldehyde sulfoxylate are stirred to a printing color with an aqueous dyestuff paste and
4 grams of glycerine and
4 grams of the pyridine betaine.

The dyestuff paste thus made up prints considerably better than a paste produced with the same thickening and 8% of glycerine without the presence of pyridine betaine.

In all the instance described under (a) to (e) dyestuff preparations are obtained, which either as such possess technical advantages (see, for example, the preparation under (a)), or as contrasted with the same preparations without the addition of the new compounds, display improved qualities of printing and fixation.

The amount of the pyridine betaine or its salts to be added may vary within the widest limits. Generally, we prefer to apply between about 20 and about 50% by weight of the same (calculated on the dyestuff present) in order to obtain the best results, but smaller or larger amounts are likewise operable.

If desired, a further addition of compounds of a hydrotropic character can be made to the preparations, or also additions of anthraquinone or derivatives thereof, such as, for example, hydroxyanthraquinones, aminoanthraquinones, anthraquinone sulfonic acids or carboxylic acids or also salts or such reduction products of these compounds containing oxygen in the meso-position. By these additions the printing qualities of the new preparations are in many instances still further improved.

It is to be pointed out that the expression "vat and sulphur dyestuff preparations for textile printing" is intended to include all preparations specified under (a) to (e) and preparations similar thereto, which can find application for printing purposes and contain pyridine betaine or a salt thereof.

The development of the printings can be carried out by the customary methods, for example, in the following manner:—After drying the printed material, the same is subjected to the action of moist steam and the dyestuff is developed by means of potassium chromate/acetic acid (2 grams of $K_2Cr_2O_7$ and 5 ccs. of 30% acetic acid in 1 litre of water), followed by soaping at the boil.

The following examples illustrate the invention, without, however, limiting it thereto:—

Example 1

A printing color having been prepared as disclosed above under (e) and containing as the dyestuff 6.6'-dichloro-4.4'-dimethylbisthionaphthene indigo and as the assistant compound pyridine betaine chlorohydrate yields substantially stronger and quicker fixing printings, than the corresponding printing color not containing pyridine betaine chlorohydrate.

Instead of the dyestuff mentioned in this example, the sulphur dyestuff obtainable by reacting upon carbazole indophenol with sulphur (see color index No. 969) may be applied.

Likewise, there may be prepared valuable dyestuff preparations with the application of the dyestuffs mentioned in the above example but while applying the methods of preparation disclosed above under (a) to (d).

Example 2

20 grams of an aqueous paste of pyranthrone or one of the dyestuffs of German Patent 239,544 obtainable by subjecting dianthrimides or a derivative thereof to the action of dehydrating agents or of 5.5'-dibenzoylamino-dianthraquinonyl-1.1'-oxamide, dimethoxy-dibenzanthrone (Caledone jade green), the dianiside of perylene-tetracarboxylic acid or isophthaloylaminoanthraquinone, said pastes having a strength of 10-20%, are stirred into 72 grams of a thickening as disclosed under (e), 4 grams of glycerine and 4 grams of pyridine betaine. The printing colors thus obtained yield substantially stronger and quicker fixing printings than the corresponding printing colors not containing pyridine-betaine.

Instead of the dyestuffs mentioned in the above examples, other dyestuffs of the anthraquinoid or indigoid series or of the series of sulphur dyestuffs may be applied with a similar effect.

Example 3

40 grams of the bluish-green dyestuff obtainable from mononitromethylbenzanthrone with sulphur at a temperature of 200-240° C. (see, German Patent 242,621), 72 grams of dynamite glycerine, 20 grams of pyridine betaine chlorohydrate, and 4 grams of anthraflavic acid are mixed with each other and the paste obtained is made up to a dyestuff content of 12%.

This printing preparation prints according to the known method with sodiumformaldehydesulfoxylate potassium carbonate without previous reduction about 40% stronger than a printing preparation containing the same ingredients but without the addition of the pyridine betaine chlorohydrate.

We claim:

1. Vat and sulphur dyestuff preparations for textile printing comprising a compound of the group consisting of pyridine betaine and its salts.

2. Vat and sulphur dyestuff pastes for textile printing comprising a polyvalent alcohol miscible with water and a compound of the group consisting of pyridine betaine and its salts.

3. Vat and sulphur dyestuff preparations for textile printing comprising a compound of the group consisting of pyridine betaine and its salts, in an amount between about 20 and about 50% by weight of the dyestuff present.

4. Vat and sulphur dyestuff pastes for textile printing comprising a polyvalent alcohol miscible with water and a compound of the group consisting of pyridine betaine and its salts in an amount between about 20 and about 50% by weight of the dyestuff present.

5. Vat and sulphur dyestuff pastes for textile printing comprising glycerine and a compound of the group consisting of pyridine betaine and its salts in an amount between about 20 and about 50% by weight of the dyestuff present.

6. A dyestuff preparation comprising the dyestuff obtainable by reacting upon mononitromethylbenzanthrone with sulphur at a temperature between about 200 and about 240° C. and a compound of the group consisting of pyridine betaine and its salts in an amount of between about 20 and about 50% by weight of the dyestuff present.

7. A dyestuff paste comprising glycerine, the dyestuff obtainable by reacting upon mononitromethylbenzanthrone with sulphur at a temperature between about 200 and about 240° C. and a compound of the group consisting of pyridine betaine and its salts in an amount of between about 20 and about 50% by weight of the dyestuff present.

HERMANN BERTHOLD.
EDUARD ALBRECHT.